United States Patent [19]

Cognard et al.

[11] Patent Number: 4,478,739
[45] Date of Patent: Oct. 23, 1984

[54] DARK COLORED COMPOSITION BASED ON LIQUID CRYSTALS

[75] Inventors: Jacques Cognard, Neuchatel; Abdurrahman N. Basturk, Hauterive, both of Switzerland

[73] Assignee: Asulab S.A., Bienne, Switzerland

[21] Appl. No.: 508,615

[22] Filed: Jun. 28, 1983

[30] Foreign Application Priority Data

Jul. 16, 1982 [CH] Switzerland ............... 4345/82

[51] Int. Cl.³ .................. G02F 1/13; C09K 3/34
[52] U.S. Cl. .................... 252/299.1; 350/349
[58] Field of Search .............. 252/299.1; 350/349

[56] References Cited

U.S. PATENT DOCUMENTS

| | | | |
|---|---|---|---|
| 3,833,287 | 9/1974 | Taylor et al. | 252/299.1 |
| 4,032,219 | 6/1977 | Constant et al. | 252/299.1 |
| 4,128,497 | 12/1978 | Cole, Jr. et al. | 252/299.1 |
| 4,145,114 | 3/1979 | Coates et al. | 252/299.1 |
| 4,273,929 | 6/1981 | Boller et al. | 252/299.1 |
| 4,304,683 | 12/1981 | Morinaka et al. | 252/299.1 |
| 4,308,161 | 12/1981 | Aftergut et al. | 252/299.1 |
| 4,308,163 | 12/1981 | Aftergut et al. | 252/299.1 |
| 4,359,398 | 11/1982 | Cole, Jr. et al. | 252/299.1 |
| 4,363,743 | 12/1982 | Moeller et al. | 252/299.1 |
| 4,376,715 | 3/1983 | Cognard et al. | 252/299.1 |
| 4,395,350 | 7/1980 | Boller et al. | 252/299.1 |

FOREIGN PATENT DOCUMENTS

| | | | |
|---|---|---|---|
| 55842 | 7/1982 | European Pat. Off. | 252/299.1 |
| 3122148 | 11/1982 | Fed. Rep. of Germany | 252/299.1 |
| 55-127485 | 10/1980 | Japan | 252/299.1 |
| 57-192928 | 11/1982 | Japan | 252/299.1 |
| 58-109578 | 6/1983 | Japan | 252/299.1 |
| 58-109579 | 6/1983 | Japan | 252/299.1 |

OTHER PUBLICATIONS

Cognard, J., et al., Mol. Cryst. Liq. Cryst., vol. 68, pp. 207–229, vol. 70, pp. 1–19, (1981).

Cox, R. J., Mol. Cryst. Liq. Cryst., vol. 55, pp. 1–32, (1979).

Jones, F., et al., Mol. Cryst. Liq. Cryst., vol. 60, pp. 99–110, (1980).

*Primary Examiner*—Teddy S. Gron
*Attorney, Agent, or Firm*—Young & Thompson

[57] ABSTRACT

The present invention relates to a dark colored composition based on liquid crystals, especially for use in a dichroic display cell. It comprises a mixture of liquid crystals and of dyes respectively red, yellow and blue. The red dye is the 4,4'-bis(p-dimethylamino-phenylazo)-2-methyl-azobenzene; the yellow dye is the 4,4'-bis(p-methoxy-phenylazo)-2-methyl-azobenzene; and the blue dye in an anthraquinonic dye of formula (III),

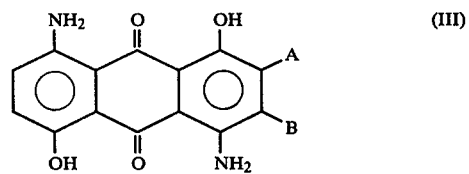

in which A is

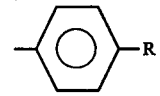

and B is H or

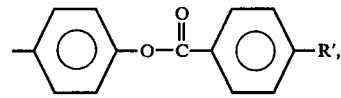

where R and R', indentical or different, are a lower alkyl or alkoxy group, one of the A and B being H when the other is not H.

6 Claims, No Drawings

DARK COLORED COMPOSITION BASED ON LIQUID CRYSTALS

The present invention relates to a dark colored composition based on liquid crystals, especially for use in a dichroic display cell.

For the realization of a dichroic display, it is particularly important to have a liquid crystal-base composition containing coloring agents respectively red, yellow and blue so as to confer an esthetically acceptable dark color to said composition. Black, dark blue, garnet-red and dark brown are colors which are particularly suitable for this application. For a dye to be used for the preparation of a composition of the precited type, it must present the following characteristics in addition to the required color:
- be soluble in the liquid crystal mixture;
- be photochemically stable; and
- have a high order parameter.

The purpose of this invention consists in providing a composition of the above mentioned type, which contains dyes fulfilling the precited requirements. This purpose is achieved with the composition according to the invention, which comprises a mixture of liquid crystals and dyes respectively of red, yellow and blue color, and which is characterized by the fact that the red dye is the 4,4'-bis (p-dimethyl-amino-phenylazo)-2-methyl-azobenzene of formula (I),

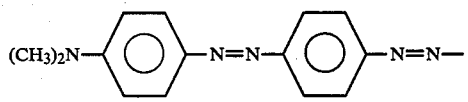
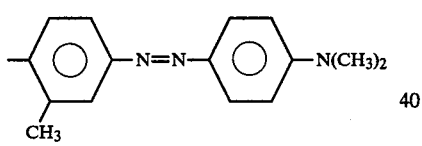
(I)

the yellow dye is the 4,4'-bis (p-methoxy-phenylazo)-2-methyl-azobenzene of formula (II),

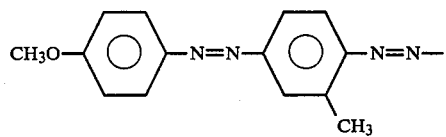
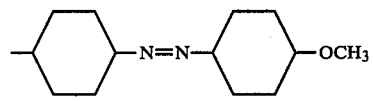
(II)

and the blue dye is an anthraquinonic derivative represented by the general formula (III),

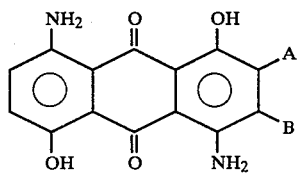
(III)

in which A is H or

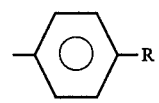

and B is H or

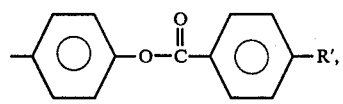

where R and R', identical or different, are a lower alkyl or alkoxy group, one of the A and B being H when the other is not H.

According to a particular embodiment of the invention, when the mixture of liquid crystals presents a positive dielectric anisotropy, the blue dye used is a derivative of formula (III) in which A is

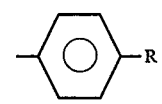

and B is H.

According to another embodiment, when the mixture of liquid crystals presents a negative dielectric anisotropy, the blue dye used is a derivative of formula (III) in which A is H and B is

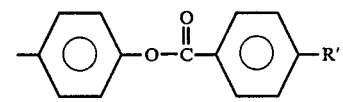

The invention will now be illustrated by reference to the following examples.

EXAMPLE 1

The three following black compositions have been prepared.

Composition A (in the mixture of liquid crystals E43 of CHISSO, with positive dielectric anisotropy):
- red compound (I): 0.4%
- yellow compound (II): 0.42%
- blue compound (IIIa): 1.08%

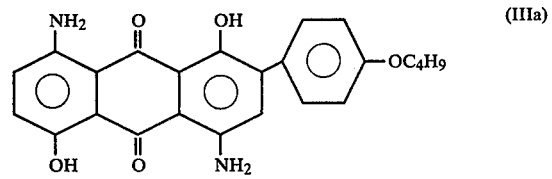

2(p-butoxy-phenyl)1,5-dihydroxy-4,8-diamino-anthraquinone

Composition B (in the mixture of liquid crystals EN24 of CHISSO, with negative dielectric anisotropy):
- red compound (I): 0.2%
- yellow compound (II): 0.32%
- blue compound (IIIb): 1.0%

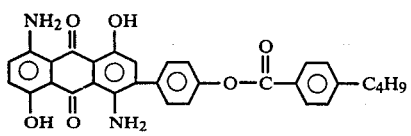

(IIIb)

3(p-butyl-phenyl-benzoate)1,5-dihydroxy-4,8-diamino-anthraquinone

Composition C (in the mixture of liquid crystals ALN76 of ASULAB S.A., with negative dielectric anisotropy):
red compound (I): 0.24%
yellow compound (II): 0.36%
blue compound (IIIb): 0.90%

EXAMPLE 2

STABILITY TO LIGHT

Measurements of photochemical stability have been carried out on one part on the dyes used in the compositions according to the invention and separately taken in three mixtures of liquid crystals, and on the other part on these same dyes for forming the black compositions A, B and C.

For these measurements, the known method especially described by J. Cognard and T. Hieu Phan in Mol. Cryst., Liq. Cryst., vol. 70, p. 1282-83, 1981, has been used, and a "SUN TEST" apparatus of Leybold-Heraeus has been used.

The values obtained have been reported on the following Table I, in hours, corresponding to the life duration, which is defined as the time until which the measured optical density became the half of the initial value.

As it can be seen on this Table I, the photochemical stability of each composition is higher than that of the less stable component of each composition. This was unexpected since an unstable component of a composition gives in principle its unstability to the whole composition.

TABLE I

| | Stability at light (in hours) | | |
|---|---|---|---|
| | Mixture of liquid crystals | | |
| | $\Delta E > 0$ | $\Delta E < 0$ | |
| Dyes | E43 | EN24 | ALN76 |
| Compound (I) | 150 | <75 | <100 |
| Compound (II) | 300 | <150 | <250 |
| Compound (IIIa) | >1000 | — | — |
| Compound (IIIb) | — | <250 | <350 |
| Composition A | >500 | — | — |
| Composition B | — | >150 | — |
| Composition C | — | — | 500 |

EXAMPLE 3

ORDER PARAMETER

The order parameter (S) has been determined according to the known method described especially by J. Cognard and T. Hieu Phan in Mol. Cryst. Liq. Cryst. 70, p. 1282, 1981, and by measuring the optical density at the maxima of absorption of each respective constituting color.

The measurements have been carried out (a) on the dyes which are present in the three black compositions A, B and C previously defined and taken on one part separately in the mixture of liquid crystals and on the other part in each composition, and (b) on the dyes of two black commercial mixtures respectively D 85/D86 (D85 and D86 mixed in a ratio of 1:1) (BDH) and ZLI1841/2+1843 (Merck), also taken on one part separately in the mixture of liquid crystals, respectively E63 and ZLI 1840, and on the other part in each of the two considered reference mixtures.

The results obtained are presented in the following Tables II and III. It arises from these results that, in the case of the dyes used in the compositions according to the invention, the order parameter of each dye is higher in the composition than when alone in the mixture of liquid crystals (L.C.), whereas the reverse result is observed in the case of the examined black commercial mixtures.

TABLE II

| | Order parameter (S) of dyes used in the compositions according to the invention | | | | | |
|---|---|---|---|---|---|---|
| | Order parameter (S) | | | | | |
| Dye | dye alone in L.C. | dye in compos. A | dye alone in L.C. | dye in compos. B | dye alone in L.C. | dye in compos. C |
| Compound (IIIa) | 0.74 | 0.79 | — | — | — | — |
| Compound (IIIb) | — | — | 0.66 | 0.70 | 0.69 | 0.73 |
| Compound (I) | 0.78 | 0.80 | 0.70 | 0.75 | 0.76 | 0.79 |
| Compound (II) | 0.77 | 0.80 | 0.73 | 0.76 | 0.76 | 0.79 |

TABLE III

| | Order parameter (S) of dyes of black commercial mixtures | | | |
|---|---|---|---|---|
| | Order parameter (S) | | | |
| Dye | dye alone in L.C. | dye in black mixt. (BDH) | dye alone in L.C. | dye in black mixt. (Merck) |
| blue | 0.72 | 0.68 | 0.72 | 0.71 |
| red | 0.76 | 0.74 | 0.74 | 0.71 |
| yellow | 0.75 | 0.72 | 0.76 | 0.72 |

EXAMPLE 4

PERCEIVED CONTRAST

The "perceived" contrast (C), corresponding to the ratio of the transmission with polarizer perpendicular to the transition moment of the dye (T⊥) to the transmission with polarizer parallel to said moment (T ∥), and intended to give an actual indication about the possibilities of using a colored mixture in a dichroic display cell, has been measured in the case of a black composition according to the invention (composition A) and in the case of two reference commercial mixtures, respectively D85/D86 (BDH) and ZLI 1841/2+1843 (Merck). This calculation method used to reach the values of the transmission from the registered spectra, is that described by A. Bloom and E. B. Priestley in IEEE Trans. Electron Devices ED-24, 823 (1977).

The results obtained are the following:

| | T⊥ (%) | C = T⊥/T ∥ |
|---|---|---|
| Composition A | 52.5 | 13.98 |
| Black mixture BDH | 52.8 | 8.68 |
| Black mixture Merck | 53.7 | 7.67 |

It can be thus seen that the perceived contrast is much higher for the composition according to the invention than for the two reference commercial black mixtures.

The above examples only concern compositions having a black color, since said color is the most suitable in dichroic displays. It is however obvious that other dark colors, such as dark blue, garnet-red and dark brown, can be obtained by modifying the proportions of the three basic compounds, the qualities of the dark compositions obtained being those of the examined black compositions.

Thus, the various physical measurements carried out, that is light stability, order parameter of the dyes and perceived contrast, show that the compositions according to the invention are ideal for use in dichroic display cells, for example according to U.S. Pat. No. 4,281,903 (in the case of a mixture of liquid crystals with negative dielectric anisotropy) or according to U.S. Pat. No. 3,833,287 (in the case of a mixture of liquid crystals with positive dielectric anisotropy). It is also possible to use the compositions of the invention in cells of the type described by Heilmeier et al. in Mol. Cryst. Liq. Cryst. vol. 8, p. 293–303, 1969; in this case, the quantity of dichroic molecules of the mixture can be reduced, a part of the light being absorbed by a polarizer placed in front of the cell.

We claim:

1. Dark colored composition based on liquid crystals, especially for use in dichroic display cell, comprising a mixture of liquid crystals and of dyes respectively red, yellow and blue, characterized by the fact that the red dye is the 4,4′-bis(p-dimethyl-amino-phenylazo)-2-methyl-azobenzene of formula (I),

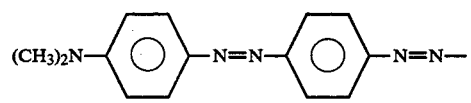
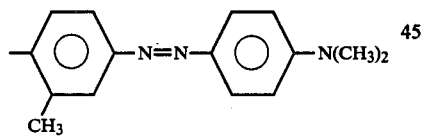

(I)

the yellow dye is the 4,4′-bis(p-methoxy-phenylazo)-2-methyl-azobenzene of formula (II),

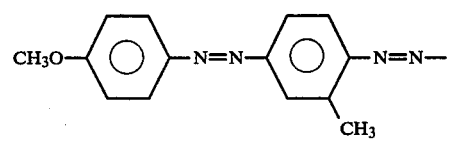
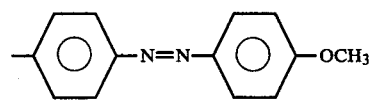

(II)

and the blue dye is an anthraquinonic derivative represented by the general formula (III),

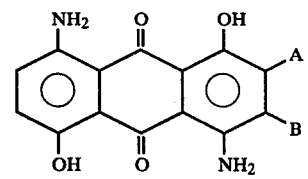

(III)

in which A is H or

and B is H or

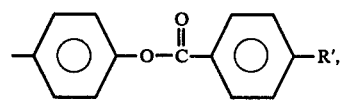

where R and R′, identical or different, are a lower alkyl or alkoxy group, one of the A and B being H when the other is not H.

2. Composition according to claim 1, in which if the mixture of liquid crystals has a positive dielectric anisotropy, then the blue dye is a compound of formula (III) in which A is

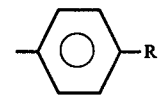

where R is as defined in claim 1, and B is H.

3. Composition according to claim 1, in which if the mixture of liquid crystals has a negative dielectric anisotropy, then the blue dye is a compound of formula (III) in which A is H and B is

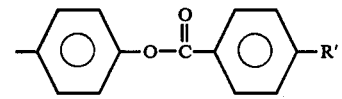

where R′ is as defined in claim 1.

4. Black composition according to claim 2, which comprises about 0.4% of compound (I), about 0.42% of compound (II) and about 1.08% of compound (IIIa),

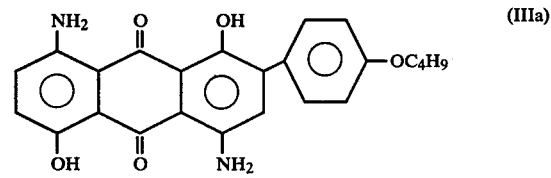

(IIIa)

in a mixture of liquid crystals with positive dielectric anisotropy.

5. Black composition according to claim 3, which comprises about 0.2% of compound (I), about 0.32% of compound (II) and about 1.0% of compound (IIIb),

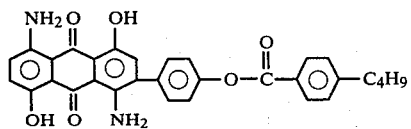
(IIIb)
in a mixture of liquid crystals with negative dielectric anisotropy.
6. Black composition according to claim 3, which comprises about 0.24% of compound (I), about 0.36% of compound (II) and about 0.90% of compound (IIIb),
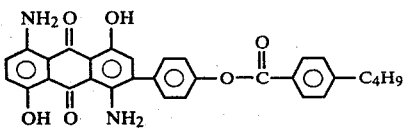
in a mixture of liquid crystals with negative dielectric anisotropy.
* * * * *